United States Patent
Day et al.

[11] 3,749,282
[45] July 31, 1973

[54] SENSOR AND TRIGGER MECHANISM
[75] Inventors: Edward G. Day, Rochester; Guy E. Giannone, North Chili, both of N.Y.
[73] Assignee: General Motors Corporation, Detroit, Mich.
[22] Filed: Apr. 2, 1971
[21] Appl. No.: 130,631

[52] U.S. Cl............. 222/5, 222/52, 222/83, 280/150 AB
[51] Int. Cl............................. B67b 7/24
[58] Field of Search ............... 222/5, 80, 82, 83, 222/500, 52; 280/150 PB; 137/38

[56] References Cited
UNITED STATES PATENTS

| | | | |
|---|---|---|---|
| 3,648,898 | 3/1972 | Day | 222/5 |
| 2,468,369 | 4/1949 | Jones | 222/5 X |
| 2,806,737 | 9/1957 | Maxwell | 137/38 UX |
| 3,105,506 | 10/1963 | Beery | 137/38 |
| 3,625,541 | 12/1971 | Frazier | 280/150 AB |
| 3,613,944 | 10/1971 | Leigler et al | 222/5 |

Primary Examiner—Robert B. Reeves
Assistant Examiner—Frederick R. Handren
Attorney—W. E. Finken and Herbert Furman

[57] ABSTRACT

A sensor and trigger mechanism of the type including a pressure vessel having an outlet secured to a cylindrical support member and sealed by a rupturable diaphragm. An axial guide pin mounted on the support extends through an axial opening in an intermediate wall of the support and slidably supports a penetrator pin for rupturing the diaphragm. The open ends of a hollow frangible glass cylinder seat between the support wall and the pin. The particular mechanism disclosed includes a ball of predetermined weight seated on a frusto-conical pedestal and held against movement by a lever arm pivoted at one end and mounting a pressure pad on the free other end thereof engaging the ball diametrically opposite the seat. A coil compression spring engages an intermediate portion of the lever. The spring seats on an embossment of the arm and on a threadedly adjustable guide pin. The free end of the lever arm includes two lateral tangs which engage the bight portion of a torsion spring to detent the bight portion against movement. A fragmentor pin is slidably mounted on the support for engagement with the glass cylinder when engaged by the bight portion of the torsion spring. A threaded nylon member includes a deflectable tang which engages an annular groove in the shank of the fragmentor pin to releasably detent the pin against movement. When the glass cylinder is fragmented, a compression spring engaging the head of the penetrator pin moves the penetrator pin into engagement with the diaphragm to rupture the diaphragm and release the contents of the pressure vessel for inflation of an occupant restraint cushion.

2 Claims, 3 Drawing Figures

PATENTED JUL 31 1973 3,749,282

INVENTORS
Edward G. Day &
BY Guy E. Giannone
Herbert Furman
ATTORNEY

SENSOR AND TRIGGER MECHANISM

This invention relates generally to sensor and trigger mechanisms of the type including a hollow cylindrical frangible glass member normally locating a penetrating member out of engagement with a rupturable diaphragm sealing a vessel providing a source of pressure fluid for inflation of an occupant restraint cushion.

The mechanism of this invention is similar to those shown and described in copending applications Ser. No. 882,668 Zeigler et al., filed Dec. 5, 1969; Ser. No. 882,669 Fairchild et al, filed Dec. 5, 1969; Ser. No. 86,895 Ranft, filed Nov. 4, 1970; and Ser. No. 104,255 Day, filed Jan. 6, 1971, all assigned to the assignee of this invention.

One of the features of this invention is that a headed fragmentor pin is positively located against movement relative to the glass member by cooperating detent means on the support and on the member. Another feature is that the cooperating detent means include a laterally resilient member engaging a groove in the pin. A further feature of this invention is that the torsion spring engageable with the fragmentor pin to drive the pin into engagement with the glass cylinder is detented against movement by engagement with adjacent spaced lateral abutments of a resiliently biased lever arm. Yet another feature of this invention is that the lever arm normally seats an inertia responsive ball under the predetermined biasing force of a compression spring seating between the support and a portion of the lever arm intermediate the ends thereof.

These and other features of the mechanism of this invention will be readily apparent from the following specification and drawings wherein.

Figure 1:
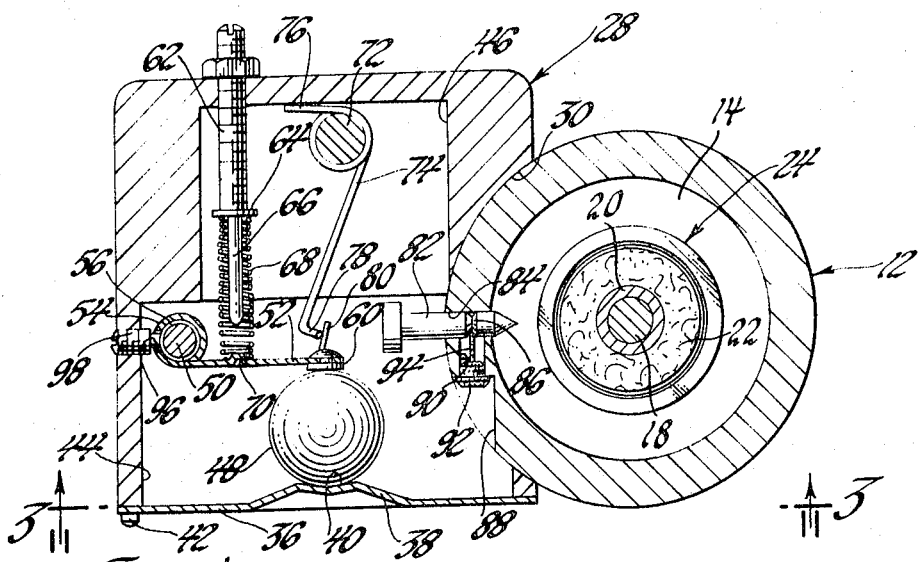
FIG. 1 is a sectional view of a sensor and trigger mechanism according to this invention in unactuated condition.
Figure 3:
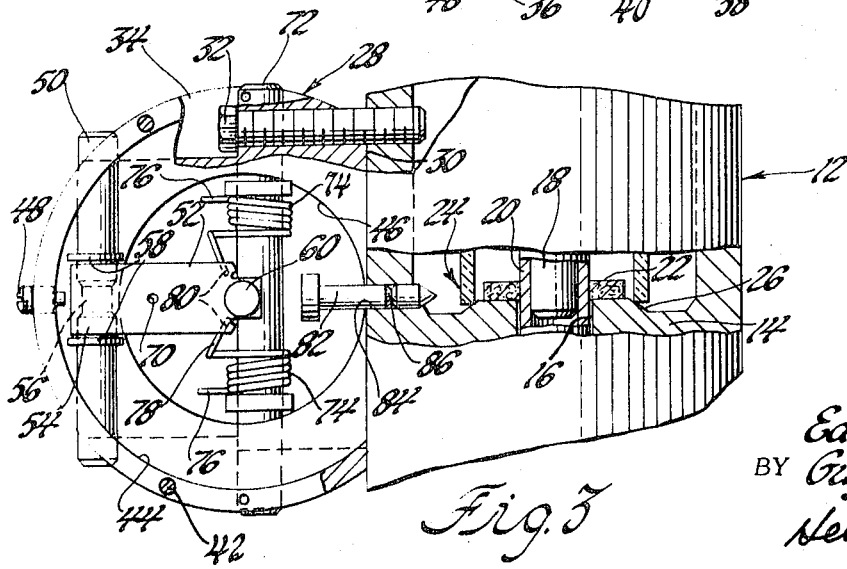
FIG. 3 is a view taken generally along the plane indicated by line 3—3 of FIG. 1.

Referring now particularly to FIGS. 1 and 3 of the drawings, the mechanism includes a generally cylindrical support 12 having an intermediate radially extending wall 14 which is centrally apertured at 16. The support 16 connects to a conventional pressure vessel providing a source of pressure fluid, the outlet of which is sealed by a conventional rupturable metal diaphragm. This connection would be downward of wall 14 as viewed in FIG. 3 and likewise the connection from the outlet of the support 12 to a conventional occupant restraint cushion would be downward of wall 14 as viewed in this Figure. These details, as well as others hereinafter referred to, are not necessary to an understanding of this invention, and reference may be had to the aforenoted copending applications for such details.

A guide pin 18 is mounted on the support upwardly of wall 14 and extends through the aperture 16 in radially spaced relationship to the wall thereof. An internally bored headed penetrating member 20 has the shank thereof slidably mounted on the guide pin 18. A felt washer 22 seats on the wall 14 adjacent the aperture 16 to seal such aperture and likewise provide a resilient cushion engaging the head of member 20 to stop the movement of the member as will be described.

A hollow frangible glass cylinder 24 has one open end thereof seating on a radially and axially tapered cylindrical boss or seat 26 of wall 14. The other open end of the cylinder seats on a like shaped seat on the head of the penetrating member 20. A compression spring, not shown, engaging the head of the penetrating member biases it downwardly, as viewed in FIG. 3, and toward the metal diaphragm of the pressure vessel.

The cylinder 24 is made of chemically treated glass commercially available under the name of Chem-Cor. Such glass has a compressive stress placed in the outer layer as a result of chemical treatment. The seat 26 and the like shaped seat on the head of the penetrating member cooperate to apply a hoop stress to the cylinder 24 so that the cylinder will readily fragmentize, as will be further described, in radially outward directions when the surface thereof is fractured by a fragmentor pin.

A cylindrical housing 28 includes a semi-cylindrical cutout 30 in a wall thereof so as to seat against the outer surface of the support 12, as shown in FIG. 1. Housing 28 is secured to the support by one or more bolts 32, FIG. 3, located within cylindrical recesses 34 in the housing and engaging tapped openings of the support 12. The open end of the housing 28 is closed by a plate 36 which includes a central pedestal 38 having a conical seat 40. Plate 36 is secured to the housing 28 at one or more places by bolts 42 received within tapped openings of the housing. The housing includes an internal bore 44 defining the open end thereof and a second internal bore 46 of smaller diameter and opening to the bore 44. A ball 48 of predetermined weight is located within bore 44 and normally seats on seat 40, as shown in FIG. 1.

A pin 50 traverses bore 44 and the ends thereof are conventionally secured to the housing 28. A sheet metal lever 52 has the curled end 54 thereof slidably and pivotally mounted on the pin 50. The pin 50 is relieved at 56 within the curl of the lever as can be seen in FIG. 3 and further includes spaced radial flanges 58 to slidably locate the lever relative to the pin. The free end of the lever 52 mounts a flat pad or seat 60 which engages ball 48 generally diametrically opposite the seat 40 to resiliently hold the ball within the seat, as will be further described, unless the ball is subjected to an acceleration pulse of predetermined amplitude and time.

An adjustable screw 62 is mounted in the wall of housing 28 opposite plate 36 and includes a seat 64 having extending therefrom a spring guide pin 66. A coil compression spring 68 seats between seat 64 and the lever 52 to normally bias the lever clockwise, as viewed in FIG. 1, and exert a predetermined resilient bias on ball 48 seating the ball on seat 40. The force of the spring 68 and the moment arm of the lever are arranged such that the ball 48 will normally remain seated unless subjected to an acceleration pulse of predetermined amplitude and time. The lever 52 includes an annular embossment 70 received within the lower open end of the spring 68 to locate the spring relative to the lever.

A pin 72 is mounted on housing 28 and extends across bore 46. Pin 72 mounts the spaced coils, FIG. 3, of a torsion spring 74. The free legs 76 of the spring engage the wall of housing 28 opposite plate 36 and the arcuate bight portion 78 of the interconnected legs of the spring is offset laterally of such legs as can be seen in FIG. 1. The bight portion engages a pair of spaced abutments 80 which are integral with and laterally offset from lever 52 to either side of the pad 60, as shown in FIG. 3. The abutments 80 detent the bight portion 78 in the position shown in FIG. 1 and block movement of the interconnected legs counterclockwise under the energy stored in the spring.

A headed fragmentor pin 82 is slidably mounted within an aperture 84 of the housing 12. The shank of the fragmentor pin includes a beveled cross section peripheral groove 86. A bore 88 of housing 12 opens to a bore 90 which threadedly receives a set screw 92 of nylon. The set screw 92 includes an integral extension 94 which engages the groove 86 to cooperatively provide a detent means positively locating the pointed end of the fragmentor pin with respect to the surface of the glass cylinder 24. The extension 94 is columnar stiff but deflectable laterally when an axial force is applied to the fragmentor pin.

Figure 2:
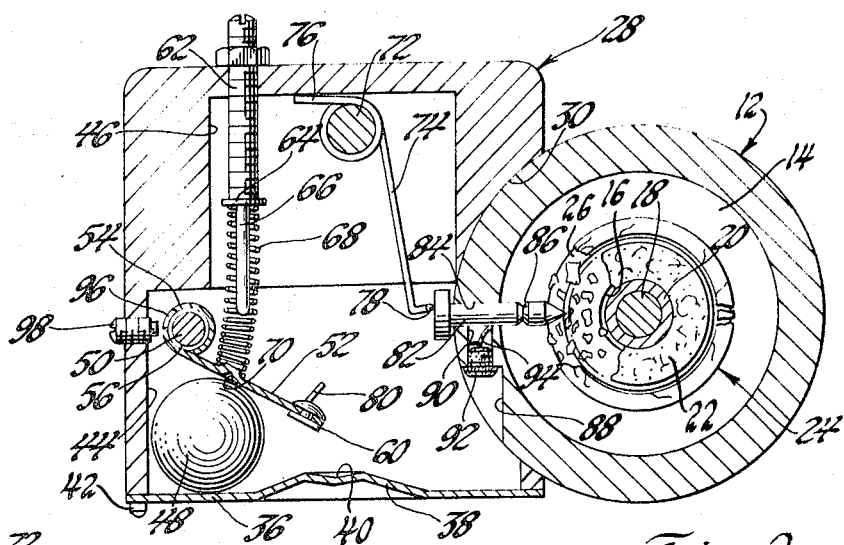
FIG. 2 is a view similar to FIG. 1 showing the mechanism in actuated position.

When an acceleration pulse of predetermined amplitude and time is received by ball 48, the ball will slide from the seat 40 from its FIG. 1 position to its position shown in FIG. 2. This permits the lever 52 to swing clockwise of pin 50 under the biasing force of spring 68 and move the abutments 80 out of engagement with the bight portion 78 of spring 74. The stored energy of the spring is thereupon released as the bight portion moves counterclockwise and engages the head of pin 82 to drive the pin into engagement with the surface of cylinder 24. The hoop stress placed on the cylinder together with the treatment of the surface thereof fragmentize the glass cylinder as soon as the surface thereof is slightly fractured by the pin 82. When the cylinder 24 is fragmentized, the penetrating member 20 is released for rupture of the diaphragm sealing the vessel and the subsequent release of the pressure fluid for inflation of the occupant restraint cushion. The felt washer 22 provides a resilient stop for the penetrating member and also provides a seal for the aperture 16 to block the flow of the pressure fluid through this aperture.

When the fragmentor pin 82 is moved into engagement with the cylinder 24 by the action of spring 74, the groove 86 moves laterally of the extension 94 and subsequently out of engagement with this extension, as can be seen from FIGS. 1 and 2, to thereby release the fragmentor pin. The beveled walls of the groove 86 cooperate with the lateral resiliency of the extension 94 to permit this movement of the fragmentor pin.

It will be noted with reference to FIGS. 1 and 2 that the curled end 54 of lever 52 includes an aperture 96 which receives an extension of an adjustable pin 98. This provides a safing mechanism as shown in FIG. 1. Pin 98 must, of course, be threaded outwardly of housing 28, as shown in FIG. 2, before the mechanism may be actuated.

Thus, this invention provides an improved sensor and trigger mechanism.

We claim:

1. In a sensor and trigger mechanism having a support, a source of pressure fluid sealed by a penetratable seal, a movable penetrating member engageable with the seal to penetrate the seal and release the pressure fluid, and a generally hollow cylindrical frangible glass member limiting movement of the penetrating member relative to the seal, the combination comprising, an enlongating fragmentizing member having a peripheral laterally opening groove and being movable longitudinally into engagement with the glass member to fragmentize the glass member and release the penetrating member, means for moving the fragmentizing member and the glass member into engagement with each other, columnar stiff laterally deflectable means engaging the groove to positively locate the fragmentizing member against movement with respect to the glass member, and means responsive to an acceleration pulse of predetermined amplitude and time for actuating the moving means to move the fragmentizing member into engagement with the glass member, the deflectable means being laterally deflected upon movement of the groove relative to and out of engagement therewith.

2. In a sensor and trigger mechanism having a support, a source of pressure fluid sealed by a penetratable seal, a movable penetrating member engageable with the seal to penetrate the seal and release the pressure fluid, and a generally hollow cylindrical frangible glass member limiting movement of the penetrating member relative to the seal, the combination comprising, an elongated fragmentizing member having a laterally opening groove and being movable longitudinally into engagement with the glass member to fragmentize the glass member and release the penetrating member, releasable means on the support engageable with the laterally opening groove of the fragmentizing member to positively locate the fragmentizing member against movement with respect to the glass member, an actuator mounted on the support for movement into engagement with the fragmentizing member to move the fragmentizing member past the releasable means and into engagement with the glass member, detent means normally maintaining the actuator out of engagement with the fragmentizing member, and means responsive to an acceleration pulse of predetermined amplitude and time for releasing the detent means and permitting the actuator to move into engagement with the fragmentizing member.

* * * * *